US011986786B2

(12) United States Patent
Nishikawa

(10) Patent No.: US 11,986,786 B2
(45) Date of Patent: May 21, 2024

(54) LIQUID STIRRING APPARATUS

(71) Applicant: Tanaka Holdings Co., Ltd., Shiga (JP)

(72) Inventor: Noritoshi Nishikawa, Shiga (JP)

(73) Assignee: Tanaka Holdings Co., Ltd., Shiga (JP)

( * ) Notice: Subject to any disclaimer, the term of this patent is extended or adjusted under 35 U.S.C. 154(b) by 649 days.

(21) Appl. No.: 17/262,007

(22) PCT Filed: Aug. 30, 2019

(86) PCT No.: PCT/JP2019/034283
§ 371 (c)(1),
(2) Date: Jan. 21, 2021

(87) PCT Pub. No.: WO2020/050185
PCT Pub. Date: Mar. 12, 2020

(65) Prior Publication Data

US 2021/0346855 A1 Nov. 11, 2021

(30) Foreign Application Priority Data

Sep. 5, 2018 (JP) ................................ 2018-165656
Mar. 25, 2019 (JP) ................................ 2019-056499

(51) Int. Cl.
*B01F 35/75* (2022.01)
*B01F 27/96* (2022.01)

(52) U.S. Cl.
CPC ........ *B01F 27/96* (2022.01); *B01F 35/75485* (2022.01)

(58) Field of Classification Search
CPC ................................................ B01F 35/32015
(Continued)

(56) References Cited

U.S. PATENT DOCUMENTS 1,172,300 A * 2/1916 Murray ................ B08B 9/0323
134/179
1,246,556 A * 11/1917 Crow ...................... A47K 5/02
312/351

(Continued)

FOREIGN PATENT DOCUMENTS

JP 52-90766 U 7/1977
JP 54-132666 U 9/1979

(Continued)

OTHER PUBLICATIONS

International Search Report (ISR) dated Nov. 26, 2019 filed in PCT/JP2019/034283.

(Continued)

*Primary Examiner* — David L Sorkin
(74) *Attorney, Agent, or Firm* — RANKIN, HILL & CLARK LLP

(57) ABSTRACT

Provided is a liquid stirring apparatus capable of stirring liquid in a wide range. A liquid stirring apparatus 100 includes a first rotating blade 110 and a second rotating blade 130 connected to a liquid discharge device 101 including a submersible pump. The first rotating blade 110 and the second rotating blade 130 include arm tubes 114 and 134 respectively extending radially outward of a first base tube 111 and a second base tube 131, and include arm tubes 115 and 135 respectively extending radially outward from intermediate tubes 113 and 133. The arm tubes 114 and 134 and the arm tubes 115 and 135 are connected to each other by connecting bodies 116 and 136 so that liquid WK can flow therethrough. The connecting bodies 116 and 136 are attached with flat plate-shaped stirring plates 117 and 137 that extend radially outward of the connecting bodies 116 and 136.

17 Claims, 10 Drawing Sheets

(58) Field of Classification Search
USPC ................................ 366/168.2; 134/179, 180
See application file for complete search history.

(56) References Cited

U.S. PATENT DOCUMENTS

| | | | | | |
|---|---|---|---|---|---|
| 1,314,622 | A * | 9/1919 | Vaudreuil | A47L 15/23 | 134/179 |
| 1,345,519 | A * | 7/1920 | Vaudreuil | A47L 15/23 | 134/182 |
| 1,408,077 | A * | 2/1922 | Clinton | A47L 15/20 | 134/179 |
| 2,192,112 | A * | 2/1940 | Vrusho | A61L 2/06 | 134/179 |
| 4,166,704 | A * | 9/1979 | Albert | B01F 25/212 | 366/342 |
| 2012/0081990 | A1 | 4/2012 | Murata | | |

FOREIGN PATENT DOCUMENTS

| | | | |
|---|---|---|---|
| JP | 55-43589 | U | 3/1980 |
| JP | 63-76687 | U | 5/1988 |
| JP | 2-51558 | U | 4/1990 |
| JP | 5-154368 | A | 6/1993 |
| JP | 2011-5349 | A | 1/2011 |
| JP | 2012-11355 | A | 1/2012 |
| JP | 2012-40556 | A | 3/2012 |
| JP | 2012-200656 | A | 10/2012 |
| JP | 3179575 | U | 11/2012 |

OTHER PUBLICATIONS

Japanese Office Action (JPOA) dated Dec. 4, 2018 issued in corresponding Japanese Patent Application No. 2018-165656 and its English translation.

Japanese Office Action (JPOA) dated Jun. 26, 2019 issued in corresponding Japanese Patent Application No. 2019-056499 and its English translation.

Japanese Office Action (JPOA) dated Oct. 29, 2019 issued in corresponding Japanese Patent Application No. 2019-056499 and its English translation.

* cited by examiner

LIQUID STIRRING APPARATUS

TECHNICAL FIELD

The present invention relates to a liquid stirring apparatus provided in liquid and stirring the liquid.

BACKGROUND ART

Conventionally, there is the liquid stirring apparatus provided in the liquid and stirring the liquid. For example, PATENT LITERATURE 1 listed below discloses a dialysate stock solution preparation apparatus as the liquid stirring apparatus. In this liquid stirring apparatus, dialysate in a tank is stirred by jetting dialysate sucked from the tank from a stirring blade extending in a cross shape, and by rotating the stirring blade.

CITATION LIST

Patent Literature

PATENT LITERATURE 1: JP-UM-A-02-051558

However, in the liquid stirring apparatus described in PATENT LITERATURE 1, the stirring blade is provided at a bottom in the tank. Therefore, there has been a problem that it is difficult to stir the liquid in a depth direction in the tank, and it is also difficult to mix the liquid with an input material such as a medicine, which is put into the liquid in the tank.

The present invention has been made to address the above problems. An object of the present invention is to provide the liquid stirring apparatus that can stir the liquid in a wide range.

SUMMARY OF THE INVENTION

In order to address the above problems, a feature of the present invention is a liquid stirring apparatus for stirring liquid, the liquid stirring apparatus including: a first main conduit that receives the liquid and allows the liquid to flow therethrough; a first rotating blade having a first base tube made of a tubular body communicating with the first main conduit, and discharging the liquid in a circumferential direction of the first base tube to rotate in the circumferential direction; a second main conduit that is formed to extend in a tubular shape from the first rotating blade in a depth direction of the liquid, and allows the liquid to flow therethrough; and a second rotating blade having a second base tube made of a tubular body communicating with the second main conduit, and discharging the liquid in a circumferential direction of the second base tube to rotate in the circumferential direction.

According to a feature of the present invention configured as described above, the liquid stirring apparatus respectively includes the first rotating blade and the second rotating blade at mutually different positions in an axial direction of the first base tube and the second base tube which introduce the liquid respectively introduced from the first main conduit and the second main conduit. Therefore, the liquid can be stirred in a wide range. In this case, the liquid stirring apparatus may be an apparatus for stirring the liquid stored in a tank, a pool or a water tank, or may be an apparatus for stirring the water in a pond or swamp. Further, in the liquid stirring apparatus, the first base tube and the second base tube may be arranged to extend in a depth direction, or may be arranged to extend in a direction perpendicular to the depth direction.

Further, according to another feature of the present invention, in the liquid stirring apparatus, the second rotating blade rotates in a direction opposite to the first rotating blade by discharging the liquid introduced from the second main conduit in a direction opposite to a discharge direction of the first rotating blade.

According to another feature of the present invention configured as described above, in the liquid stirring apparatus, the second rotating blade rotates in a direction opposite to the first rotating blade by discharging the liquid introduced from the second main conduit in a direction opposite to a liquid discharge direction of the first rotating blade. Therefore, the liquid can be stirred more effectively.

Another feature of the present invention is that in the liquid stirring apparatus, the second rotating blade rotates at a higher speed than the first rotating blade.

According to another feature of the present invention configured as described above, in the liquid stirring apparatus, the second rotating blade rotates at the higher speed than the first rotating blade. Therefore, the liquid can be stirred more effectively. Especially when an input material such as a medicine is put into the liquid, a surface layer into which the input material has been put can be rapidly stirred.

Another feature of the present invention is that in the liquid stirring apparatus, the second rotating blade is formed of a tube smaller than the first rotating blade.

According to another feature of the present invention configured as described above, in the liquid stirring apparatus, the second rotating blade is formed of the tube smaller than the first rotating blade. Therefore, the second rotating blade located at a position away from a liquid discharge device can be rotated effectively.

Further, according to another feature of the present invention, in the liquid stirring apparatus, at least one of the first rotating blade and the second rotating blade includes a stirring plate formed in a plate shape extending in a direction intersecting the direction of rotation.

According to another feature of the present invention configured as described above, in the liquid stirring apparatus, the first rotating blade and/or the second rotating blade is provided with the plate-shaped stirring plate extending in the direction intersecting the direction of rotation. Therefore, the liquid can be stirred in a wide range.

Another feature of the present invention is that in the liquid stirring apparatus, the stirring plate is provided not perpendicular to but inclined to the direction of rotation.

According to another feature of the present invention configured as described above, in the liquid stirring apparatus, the stirring plate is provided not perpendicular to but inclined to the direction of rotation of the first rotating blade and/or the second rotating blade. Therefore, effective stirring can be performed while suppressing stirring resistance of the liquid. In this case, in the liquid stirring apparatus, since the stirring plate is inclined to face a water surface direction side or a water bottom direction side, the liquid can be stirred in the depth direction.

Another feature of the present invention is that in the liquid stirring apparatus, the stirring plate is detachably provided in the first rotating blade and/or the second rotating blade.

According to another feature of the present invention configured as described above, in the liquid stirring apparatus, the stirring plate is detachably provided in the first rotating blade and/or the second rotating blade. Therefore, the stirring plate can be attached to and detached from the first rotating blade and/or the second rotating blade depending on the need for the stirring plate. Thus, for example, when the stirring plate is not required, it is possible to perform rotation drive of the first rotating blade and/or the second rotating blade while suppressing rotation resistance thereof by removing the stirring plate. That is, in the liquid stirring apparatus, one liquid stirring apparatus can selectively use strong stirring of the liquid using the stirring plate and gentle stirring without using the stirring plate. In addition, when the liquid stirring apparatus is carried, it is possible to easily transport and store the liquid stirring apparatus by removing the stirring plate.

Another feature of the present invention is that in the liquid stirring apparatus, the stirring plate is provided changeable in direction with respect to the first rotating blade and/or the second rotating blade.

According to another feature of the present invention configured as described above, in the liquid stirring apparatus, the stirring plate is provided changeable in direction with respect to the first rotating blade and/or the second rotating blade. Therefore, it is possible to adjust a strength of stirring and to increase or decrease a magnitude of the stirring resistance by a mounting angle of the stirring plate. That is, in the liquid stirring apparatus, by setting a direction of the stirring plate parallel to a rotation direction of the rotating blade, it is possible to minimize the strength of stirring and to minimize the rotation resistance of the rotating blade, thereby suppressing energy required for stirring. In addition, in the liquid stirring apparatus, when the liquid stirring apparatus is carried, it is also possible to easily transport and store the liquid stirring apparatus by appropriately changing the direction of the stirring plate.

Moreover, according to another feature of the present invention, in the liquid stirring apparatus, at least one of the first rotating blade and the second rotating blade includes at least two arm tubes made of at least two tubular bodies, the tubular bodies extend radially at mutually different positions in an axial direction of a corresponding one of the first base tube and the second base tube, and the arm tubes rotate in the circumferential direction by discharging the liquid in the circumferential direction of the base tubes.

According to another feature of the present invention configured as described above, in the liquid stirring apparatus, at least one of the first rotating blade and the second rotating blade includes arm tubes made of at least two tubular bodies, and the tubular bodies extend radially at mutually different positions in the axial direction of the corresponding base tube. Therefore, the liquid can be effectively stirred.

Another feature of the present invention is that the liquid stirring apparatus further includes a connecting body for connecting the at least two arm tubes to each other.

According to another feature of the present invention configured as described above, the liquid stirring apparatus further includes the connecting body for connecting the at least two arm tubes to each other. Therefore, rigidity of the arm tube extending from each main conduit can be increased.

Another feature of the present invention is that in the liquid stirring apparatus, the connecting body is formed in a tubular shape to allow the liquid to flow between the arm tubes connected to each other.

According to another feature of the present invention configured as described above, in the liquid stirring apparatus, the connecting body is formed in a tubular shape to allow the liquid to flow between the arm tubes connected to each other. Therefore, it is possible to eliminate a difference in discharge force between the arm tubes and to perform stirring while suppressing unevenness.

Another feature of the present invention is that in the liquid stirring apparatus, the stirring plate is provided on the connecting body.

According to another feature of the present invention configured as described above, in the liquid stirring apparatus, the stirring plate is provided on the connecting body. Therefore, the connecting body can effectively stir the liquid between the arm tubes connected to each other.

Moreover, according to another feature of the present invention, in the liquid stirring apparatus, at least one of the first rotating blade and the second rotating blade includes at least two arm tubes made of at least two tubular bodies, the tubular bodies extend radially at mutually different positions in an axial direction of a corresponding one of the first base tube and the second base tube, and the arm tubes rotate in the circumferential direction by discharging the liquid in the circumferential direction of the base tubes.

According to another feature of the present invention configured as described above, in the liquid stirring apparatus, the first rotating blade and/or the second rotating blade includes the arm tubes made of at least two tubular bodies, and the tubular bodies extend radially at mutually different positions in the axial direction of the base tubes. Therefore, the liquid can be stirred strongly in a wide range.

Another feature of the present invention is that the liquid stirring apparatus further includes a connecting body for connecting the at least two arm tubes to each other.

According to another feature of the present invention configured as described above, the liquid stirring apparatus further includes the connecting body for connecting the at least two arm tubes to each other. Therefore, rigidity of the arm tube extending from each main conduit can be increased.

Another feature of the present invention is that in the liquid stirring apparatus, the connecting body is formed in a tubular shape to allow the liquid to flow between the arm tubes connected to each other.

According to another feature of the present invention configured as described above, in the liquid stirring apparatus, the connecting body is formed in a tubular shape to allow the liquid to flow between the arm tubes connected to each other. Therefore, it is possible to eliminate a difference in discharge force between the arm tubes and to perform stirring while suppressing unevenness.

According to another feature of the present invention, the liquid stirring apparatus further includes a rotating joint for rotatably connecting at least one of the first rotating blade and the second rotating blade to a corresponding one of the first main conduit and the second main conduit. The rotating joint includes: a tubular enlarged diameter portion formed in a tubular shape having an outer diameter that increases from a portion where the base tube is connected in the rotating blade to a portion where the main conduit is connected; a tubular reduced diameter portion formed in a tubular shape having an inner diameter that is reduced while covering an outer circumferential surface of the tubular enlarged diameter portion through a tubular gap from the portion where the main conduit is connected; and a tubular flow path that is formed by the tubular gap between the outer circumferential surface of the tubular enlarged diameter portion and an inner circumferential surface of the tubular reduced diameter portion, and communicates with an inside of the main conduit and an outside of the main conduit.

According to another feature of the present invention configured as described above, the liquid stirring apparatus further includes the rotating joint for rotatably connecting at least one of the first rotating blade and the second rotating blade to the corresponding one of the first main conduit and the second main conduit. In this case, the rotating joint is configured to have the tubular flow path that is formed by the tubular gap between the outer circumferential surface of the tubular enlarged diameter portion and the inner circumferential surface of the tubular reduced diameter portion, and communicates with the inside of the main conduit and the outside of the main conduit. Thus, in the liquid stirring apparatus, since the liquid supplied from the main conduit flows through the tubular flow path, the rotating blade can smoothly rotate with respect to the main conduit.

According to another feature of the present invention, in the liquid stirring apparatus, the tubular enlarged diameter portion is configured to have an inclined surface having gradually increasing outer diameter and inner diameter, and the tubular enlarged diameter portion and the main conduit are formed so that their tip portions can face each other and abut each other.

According to another feature of the present invention configured as described above, in the liquid stirring apparatus, the tubular enlarged diameter portion is configured to have the inclined surface having gradually increasing outer diameter and inner diameter. Further, the tubular enlarged diameter portion and the main conduit are formed so that their tip portions can face each other and abut each other. Therefore, by supply of the liquid from the main conduit or stop of the supply, the rotating blade moves away from or abuts the main conduit. Thus, in the liquid stirring apparatus, the liquid supplied from the main conduit can be introduced to the tubular flow path. Further, when the supply of the liquid from the main conduit is stopped, it is possible to prevent the tubular enlarged diameter portion and further the base tube of the rotating blade from entering the main conduit.

Another feature of the present invention is that in the liquid stirring apparatus, in the rotating blade, a discharge port for discharging the liquid is inclined toward the rotating joint side with respect to a rotation plane of the rotating blade.

According to another feature of the present invention configured as described above, in the liquid stirring apparatus, in the rotating blade connected to the main conduit through the rotating joint, the discharge port for discharging the liquid is inclined toward the rotating joint side with respect to the rotation plane of the rotating blade. Therefore, by discharging the liquid from the rotating blade, it is possible to effectively separate the rotating blade from the main conduit, and to effectively introduce the liquid supplied from the main conduit to the tubular flow path.

DESCRIPTION OF THE EMBODIMENTS

Figure 1:
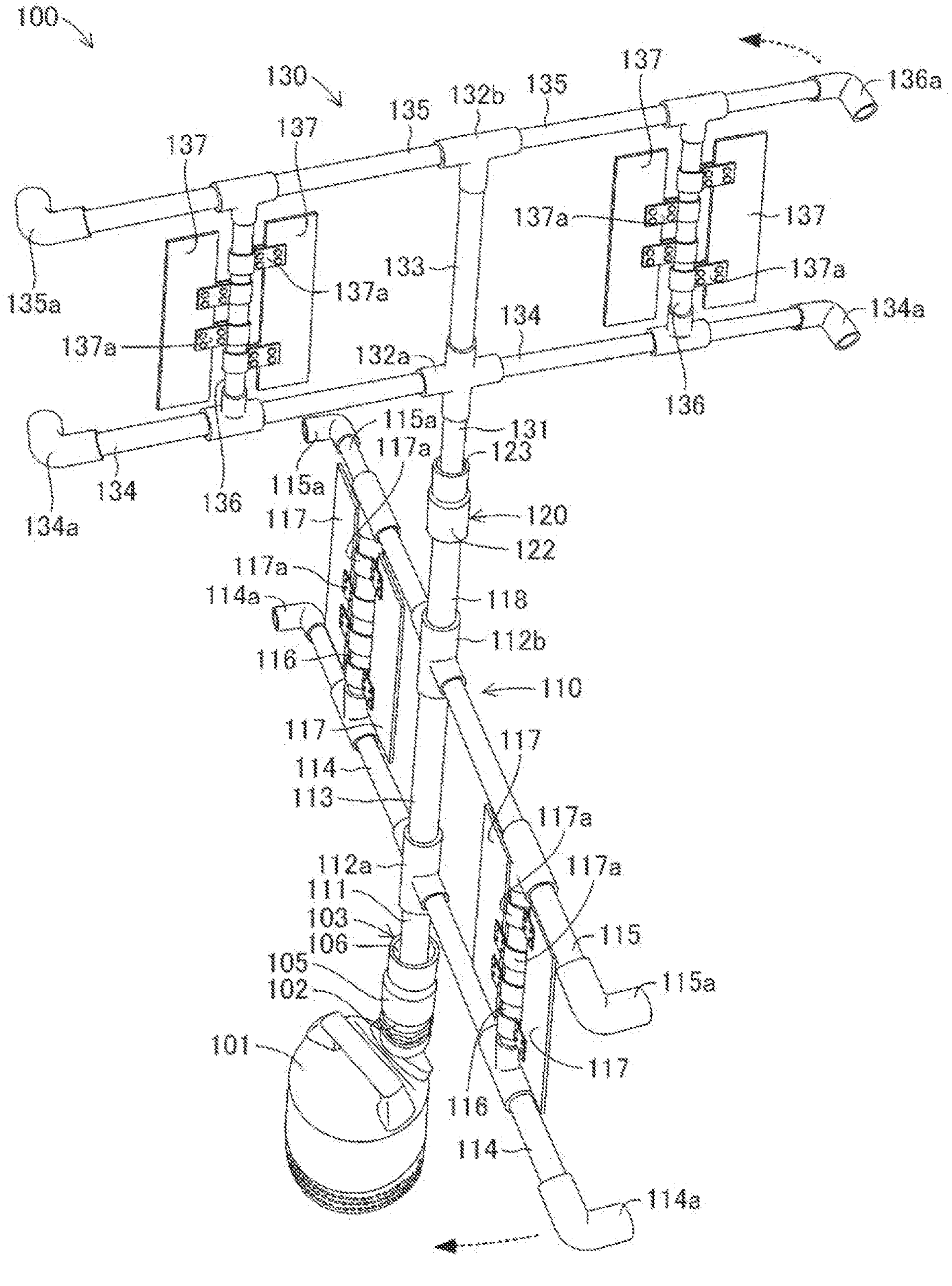
FIG. 1 is a perspective view schematically showing an external structure of a liquid stirring apparatus according to the present invention.
Figure 2:
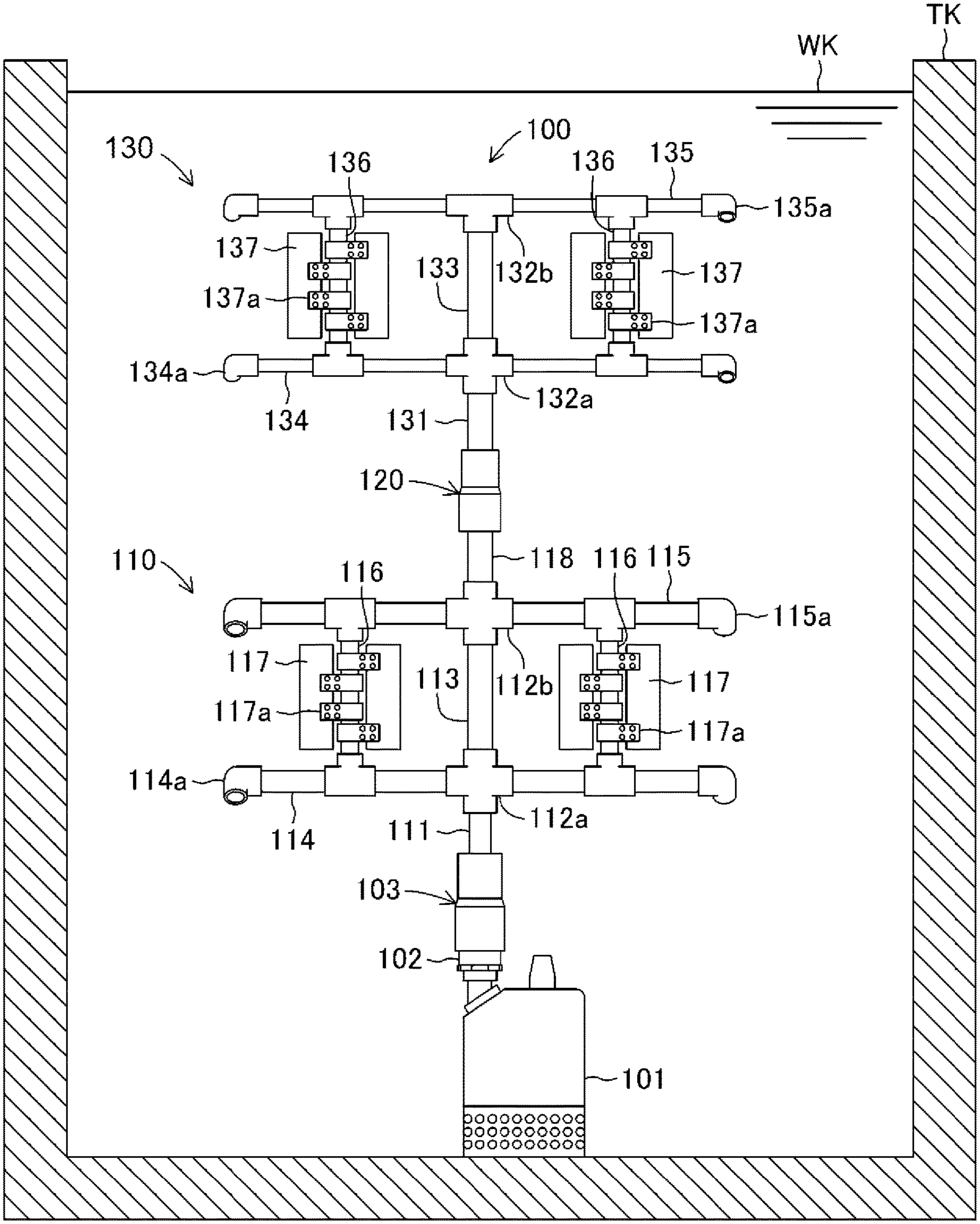
FIG. 2 is a cross-sectional view schematically showing a state where the liquid stirring apparatus shown in FIG. 1 is installed in a water tank.

Hereinafter, an embodiment of a liquid stirring apparatus according to the present invention will be described with reference to the drawings. FIG. 1 is a perspective view schematically showing an external structure of a liquid stirring apparatus 100 according to the present invention. FIG. 2 is a cross-sectional view schematically showing a state where the liquid stirring apparatus 100 shown in FIG. 1 is installed in a water tank TK. The drawings referred to in the present specification are schematically shown to facilitate understanding of the present invention, and for example, some components are shown exaggerated. Therefore, dimensions, ratios and the like of the components may be different. The liquid stirring apparatus 100 is a mechanical apparatus used for stirring liquid WK in a water tank TK for storing and neutralizing the liquid WK including alkaline drainage which has been used for concrete chipping work.

(Structure of Liquid Stirring Apparatus 100)

The liquid stirring apparatus 100 includes a liquid discharge device 101. The liquid discharge device 101 is a mechanical apparatus that sucks and discharges the liquid WK stored in the water tank TK. In the present embodiment, the liquid discharge device 101 is constituted by an electric submersible pump of a size that can be carried by a person. The submersible pump sucks the liquid WK from a lower portion of its main body formed in a substantially columnar shape and discharges the liquid WK from a discharge port provided in an upper portion of the main body. A first main conduit 102 is connected to the discharge port of the liquid discharge device 101.

The first main conduit 102 is a component that forms a flow path for introducing the liquid WK output from the liquid discharge device 101 to a first rotating blade 110 and a second rotating blade 130. The first main conduit 102 is formed of a tubular body made of a resin material or a metal material formed in a cylindrical shape. In the present embodiment, the first main conduit 102 is formed of a pipe material made of a vinyl chloride resin. In the first main conduit 102, one end (lower side in the drawing) is detachably connected to the discharge port of the liquid discharge device 101 by screw fitting, and the other end (upper side in the drawing) is connected to a first rotating joint 103.

Figure 3:
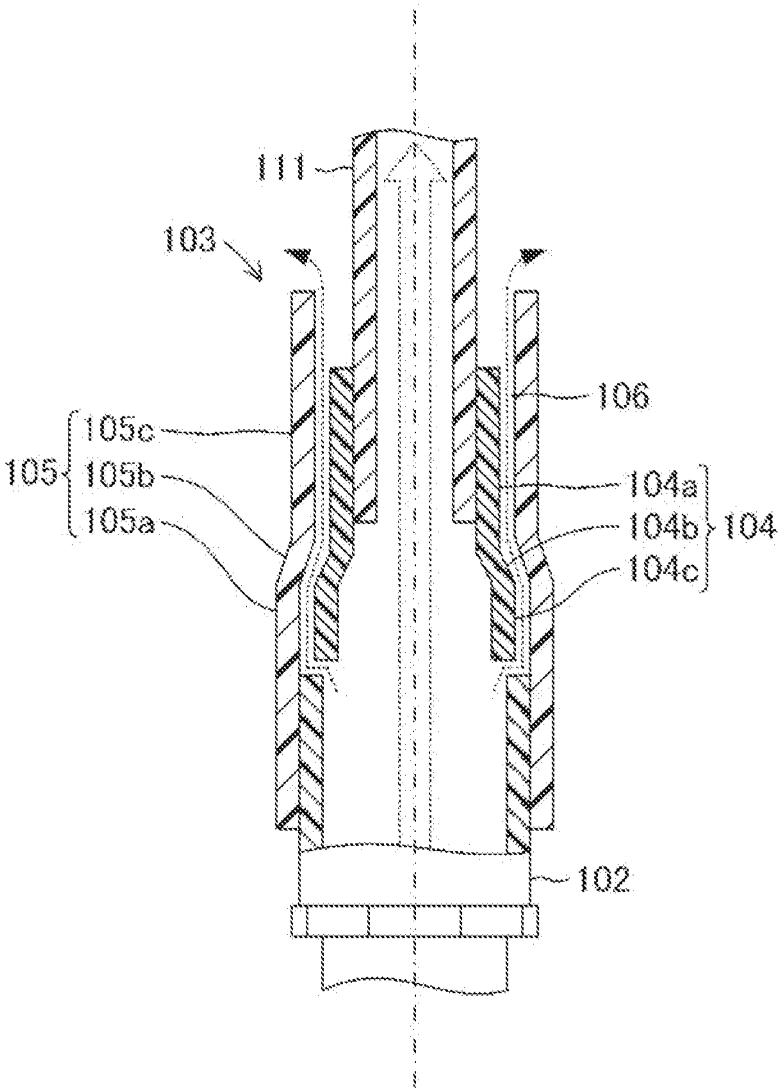
FIG. 3 is a cross-sectional view schematically showing an internal structure of a first rotating joint in the liquid stirring apparatus shown in FIG. 1.

As shown in FIG. 3, the first rotating joint 103 is a portion for rotatably connecting the first rotating blade 110 to the first main conduit 102. The first rotating joint 103 is mainly configured to include a tubular enlarged diameter portion 104, a tubular reduced diameter portion 105, and a tubular flow path 106. The tubular enlarged diameter portion 104 is a component that is attached to a tip portion of a first base tube 111 extending from the first rotating blade 110 and forms the tubular flow path 106. The tubular enlarged diameter portion 104 is formed by forming the resin material or the metal material into a cylindrical shape. More specifically, the tubular enlarged diameter portion 104 is configured to include a fitting portion 104*a*, an inclined surface 104*b* and a facing portion 104*c*.

The fitting portion 104*a* is a portion that fits outside the tip portion of the first base tube 111 of the first rotating blade 110. The fitting portion 104*a* is formed in a cylindrical shape extending linearly. In this case, the fitting portion 104*a* is fixed to the tip portion of the first base tube 111 of the first rotating blade 110 with an adhesive. The inclined surface 104*b* is a tapered portion in which an outer diameter and an inner diameter thereof are respectively gradually increased to be larger than the outer diameter and the inner diameter of the first base tube 111 of the first rotating blade 110.

The facing portion 104*c* is formed in a linearly extending cylindrical shape having a maximum outer diameter that has been enlarged on the inclined surface 104*b*. The facing portion 104*c* is formed to have a size and a thickness that abut a tip portion of the first main conduit 102 extending from the liquid discharge device 101. In the present embodiment, the facing portion 104*c* is formed to have an outer diameter slightly smaller than the outer diameter of the first main conduit 102. Note that the tubular enlarged diameter portion 104 may be formed integrally with the tip portion of the first base tube 111 of the first rotating blade 110.

The tubular reduced diameter portion 105 is a component that is attached to the tip portion of the first main conduit 102 extending from the liquid discharge device 101 and forms the tubular flow path 106. The tubular reduced diameter portion 105 is formed by forming the resin material or the metal material into a cylindrical shape. More specifically, the tubular reduced diameter portion 105 is configured to include a fitting portion 105*a*, an inclined surface 105*b* and an outflow portion 105*c*, which are formed to have a size to cover an outer circumferential surface of the tubular enlarged diameter portion 104 through a gap.

The fitting portion 105*a* is a portion that fits outside the tip portion of the first main conduit 102 extending from the liquid discharge device 101. The fitting portion 105*a* is formed in a cylindrical shape extending linearly. In this case, the fitting portion 105*a* is fixed to the tip portion of the first main conduit 102 with the adhesive. The fitting portion 105*a* is formed to have a length that covers the facing portion 104*c* of the tubular enlarged diameter portion 104.

The inclined surface 105*b* is a tapered portion in which the outer diameter and the inner diameter of the fitting portion 105*a* are gradually reduced. In this case, the inclined surface 105*b* may be formed to have the same inclination angle as the inclined surface 104*b* of the tubular enlarged diameter portion 104. However, since they are formed to have different inclination angles from each other, they are prevented from being in close contact with each other, and the tubular flow path 106 can be easily formed.

The outflow portion 105*c* is a portion for stably rotating the first rotating blade 110. The outflow portion 105*c* is formed in a straight cylindrical shape that extends in parallel with the fitting portion 104*a* having a minimum inner diameter that has been reduced on the inclined surface 104*b*. In this case, the outflow portion 105*c* is formed to have a length protruding from an upper end of the fitting portion 104*a* in the drawing.

The tubular flow path 106 is a portion that allows the tubular enlarged diameter portion 104 and the tubular reduced diameter portion 105 to rotate relative to each other by forming a flow path that allows a part of the liquid WK discharged from the liquid discharge device 101 and introduced into the first main conduit 102 to leak outside. The tubular flow path 106 is formed by a cylindrical gap between the outer circumferential surface of the tubular enlarged diameter portion 104 and an inner circumferential surface of the tubular reduced diameter portion 105. In the present embodiment, in the tubular flow path 106, the gap between the outer circumferential surface of the tubular enlarged diameter portion 104 and the inner circumferential surface of the tubular reduced diameter portion 105 is set to 2 mm. In FIG. 3, flow of the liquid WK is indicated by a dashed arrow.

Here, a method for assembling the first rotating joint 103 will be briefly described. First, an operator inserts the tubular reduced diameter portion 105 onto the first base tube 111 from a lower end of the first base tube 111 in the drawing, and then inserts the fitting portion 104*a* of the tubular enlarged diameter portion 104 onto the lower end of the first base tube 111 in the drawing, to adhesively fix them. Next, the operator positions the tubular reduced diameter portion 105 inserted onto the first base tube 111 outside the tubular enlarged diameter portion 104. Further, the operator adhesively fixes the fitting portion 105*a* to the tip portion of the first main conduit 102. Thus, the first rotating joint 103 can be assembled.

The first rotating blade 110 is a component for stirring the liquid WK in the water tank TK by discharging a part of the liquid WK supplied from the liquid discharge device 101. The first rotating blade 110 is formed by combining a tubular body and a plate-shaped body made of resin or metal. The first rotating blade 110 is configured to mainly include the first base tube 111, branch tubes 112*a* and 112*b*, an intermediate tube 113, arm tubes 114 and 115, connecting bodies 116, and stirring plates 117.

The first base tube 111 is a component that supports the first rotating blade 110 and the second rotating blade 130, and introduces the liquid WK introduced from the first main conduit 102 through the first rotating joint 103 to the first rotating blade 110 itself and the second rotating blade 130. The first base tube 111 is formed of a cylindrical body made of a vinyl chloride resin and extending linearly in a vertical direction. In the first base tube 111, the tubular enlarged diameter portion 104 is connected to one end thereof (lower side in the drawing), and the branch tube 112*a* is connected to the other end thereof (upper side in the drawing).

The branch tube 112*a* is a component made of a vinyl chloride resin for branching the liquid WK introduced from the first base tube 111 in three directions. The branch tube 112*a* is formed in a cross shape in which two flow paths extending linearly are perpendicular to each other. The intermediate tube 113 to which the branch tube 112*b* is connected is connected to the branch tube 112*a*. Further, two arm tubes 114 are connected to the branch tube 112*a* in a direction perpendicular to an axial direction of the first base tube 111.

The branch tube 112*b* is a component made of a vinyl chloride resin for branching the liquid WK introduced from the intermediate tube 113 in three directions, similarly to the branch tube 112*a*. The branch tube 112*b* is formed in a cross shape in which two flow paths extending linearly are perpendicular to each other. The branch tube 112*b* is connected with a second main conduit 118 connected to a second rotating joint 120 coaxially with the intermediate tube 113. Further, the branch tube 112*b* is connected with two arm tubes 115 in a direction perpendicular to an axial line of the intermediate tube 113.

The intermediate tube 113 is a component for introducing the liquid WK introduced from the branch tube 112*a* to the branch tube 112*b*. The intermediate tube 113 is formed of a cylindrical tube. In the present embodiment, the intermediate tube 113 is formed of a pipe material made of a vinyl chloride resin and extending linearly. The intermediate tube 113 is provided coaxially with the first base tube 111.

Each two of the two arm tubes 114 and the two arm tubes 115 are components that respectively introduce the liquid WK respectively introduced from the branch tubes 112*a* and 112*b* radially outward of the first base tube 111. The arm tubes 114 and 115 are formed of a cylindrical body made of a vinyl chloride resin and extending linearly in a horizontal direction. In this case, the two arm tubes 114 and the two arm tubes 115 are formed to have the same length and the same inner and outer diameters in the present embodiment. However, each two of the two arm tubes 114 and the two arm tubes 115 may be formed to have different lengths and/or different inner and outer diameters. In the present embodiment, each two of the two arm tubes 114 and the two arm tubes 115 are provided coaxially with each other (in other words, on a straight line). However, each two of the two arm tubes 114 and the two arm tubes 115 may be provided at a position where their central axes are different from each other.

In the present embodiment, the two arm tubes 114 and the two arm tubes 115 are formed to have the same length and the same inner and outer diameters. However, the two arm tubes 114 and the two arm tubes 115 may be formed to have different lengths and/or inner and outer diameters. Further, in the present embodiment, the two arm tubes 114 and the two arm tubes 115 are provided at the same position in a circumferential direction of the first base tube 111, that is, the arm tubes 115 are provided immediately above the arm tubes 114 and are provided in parallel with each other. However, the arm tubes 114 and the arm tubes 115 may be provided non-parallel to each other at the same position in the circumferential direction of the first base tube 111. Or, the arm tubes 114 and the arm tubes 115 may be provided at different positions in the circumferential direction of the first base tube 111, that is, the arm tubes 115 may be provided at positions other than immediately above the arm tubes 114. Discharge tubes 114*a* and 115*a* are respectively provided at tip portions of the arm tubes 114 and 115.

The two discharge tubes 114*a* and 115*a* are components made of a vinyl chloride resin, and discharge the liquid WK introduced from the arm tubes 114 and 115 to the circumferential direction (or a tangential direction in the circumferential direction) of the first base tube 111 so that the first rotating blade 110 rotates. The two discharge tubes 114*a* and 115*a* are formed of a substantially L-shaped cylindrical body bent in a direction perpendicular to the axial direction of the arm tubes 114 and 115. In this case, in each of the discharge tubes 114*a* and 115*a*, the discharge port for discharging the liquid WK is provided to face obliquely downward with respect to a horizontal circumferential direction of the first base tube 111.

The connecting body 116 is a component for connecting the two arm tubes 114 and the two arm tubes 115 facing each other, in a state where the liquid WK can flow through each other. The connecting body 116 is formed of a cylindrical tubular body. In the present embodiment, the connecting body 116 is configured such that a branch tube similar to a branch tube 132*b* described below is provided at both ends of the pipe material made of a vinyl chloride resin that extends linearly. The connecting body 116 is provided at an intermediate portion in a longitudinal direction of the arm tubes 114 and 115, or at a position on the side of the discharge tubes 114*a* and 115*a* from the intermediate portion.

The stirring plate 117 is a component for stirring the liquid WK. The stirring plate 117 is formed in a flat plate shape. In the present embodiment, the stirring plate 117 is formed by forming the metal material into a rectangular shape extending in the axial direction of the connecting body 116 in a front view. The stirring plates 117 are attached to both sides of the connecting body 116 through an attachment tool 117*a*, in the axial direction of the arm tubes 114 and 115. In this case, the stirring plate 117 is provided in a direction perpendicular to a direction in which the first rotating blade 110 rotates.

Further, in the present embodiment, the stirring plate 117 is formed to have a size that does not protrude from the tip portions of the arm tubes 114 and 115, that is, the discharge tubes 114*a* and 115*a*. However, the stirring plate 117 may be formed to have a size that protrudes outward from the discharge tubes 114*a* and 115*a*. Further, one or three or more stirring plates 117 can also be attached to the connecting body 116.

The attachment tool 117*a* is a component for attaching the stirring plate 117 to the connecting body 116. The attachment tool 117*a* is formed by forming the metal material into a band shape. In the present embodiment, in the attachment tool 117*a*, both ends of an elongated metal plate are fixed by bolts and nuts with the stirring plate 117 interposed therebetween, and a central portion of the metal plate is wound around an outer circumferential portion of the connecting body 116, to be fastened with bolts and nuts. Thus, the stirring plate 117 is attached to the connecting body 116. As a result, the attachment tool 117*a* can detachably attach the stirring plate 117 to the connecting body 116 in any direction in a circumferential direction of the connecting body 116.

The second main conduit 118 is a component that forms a flow path for introducing the liquid WK introduced through the first rotating blade 110 to the second rotating blade 130. Similarly to the first main conduit 102, the second main conduit 118 is formed of a tubular body made of a resin material or a metal material formed in a cylindrical shape. In the present embodiment, similarly to the first main conduit 102, the second main conduit 118 is formed of a pipe material made of a vinyl chloride resin, and is formed to extend in a depth direction of the water tank TK. The second main conduit 118 is formed to have a smaller inner diameter than the first main conduit 102. In the second main conduit 118, one end (lower side in the drawing) is adhesively fixed to the branch tube 112*b*, and the other end (upper side in the drawing) is connected to the second rotating joint 120.

Figure 4:
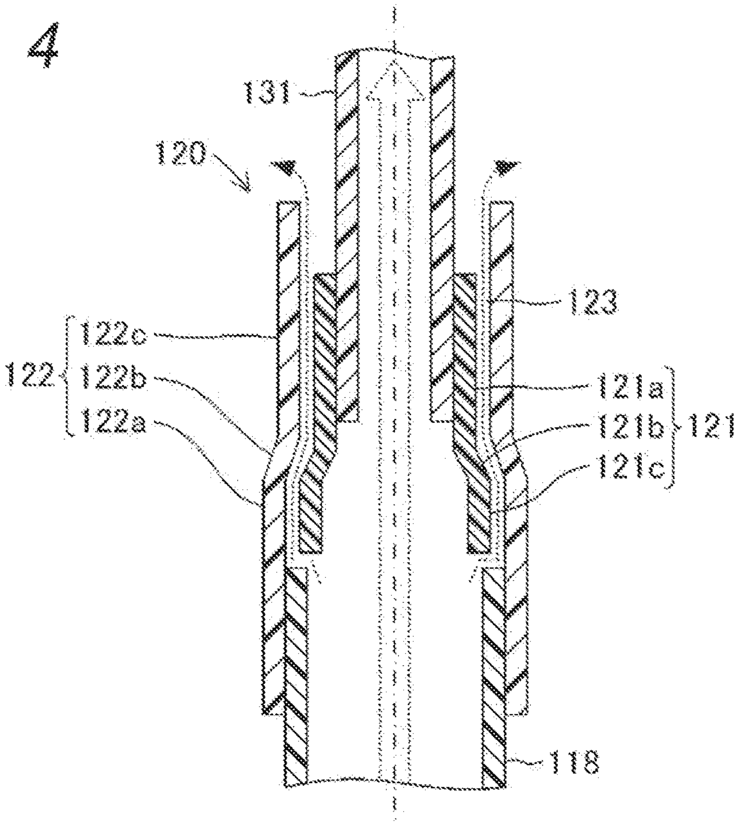
FIG. 4 is a cross-sectional view schematically showing an internal structure of a second rotating joint in the liquid stirring apparatus shown in FIG. 1.

As shown in FIG. 4, the second rotating joint 120 is a portion for rotatably connecting the second rotating blade 130 to the second main conduit 118. The second rotating joint 120 is configured similarly to the first rotation connection part 103. That is, the second rotating joint 120 is configured to include a tubular enlarged diameter portion 121, a fitting portion 121*a*, an inclined surface 121*b*, a facing portion 121*c*, a tubular reduced diameter portion 122, and a fitting portion 122*a*, an inclined surface 122*b*, an outflow portion 122*c* and a tubular flow path 123 respectively corresponding to the tubular enlarged diameter portion 104, the fitting portion 104*a*, the inclined surface 104*b*, the facing portion 104*c*, the tubular reduced diameter portion 105, the fitting portion 105*a*, the inclined surface 105*b*, the outflow portion 105*c* and the tubular flow path 106 in the first rotating joint 103.

Since the second rotating joint 120 has the same structure as the first rotating joint 103, description thereof will be omitted. Further, the second rotating joint 120 is assembled in the same manner as the first rotating joint 103. In FIG. 4, the flow of the liquid WK is indicated by a dashed arrow.

The second rotating blade 130 is a component for stirring the liquid WK in the water tank TK by discharging a part of the liquid WK supplied from the liquid discharge device 101, similarly to the first rotating blade 110. The second rotating blade 130 is formed by combining a tubular body and a plate-shaped body made of resin or metal. The second rotating blade 130 is configured to include a second base tube 131, branch tubes 132*a* and 132*b*, an intermediate tube 133, arm tubes 134 and 135, discharge tubes 134*a* and 135*a*, a connecting body 136, a stirring plate 137 and an attachment tool 137*a* respectively corresponding to the first base tube 111, the branch tubes 112*a* and 112*b*, the intermediate tube 113, the arm tubes 114 and 115, the discharge tubes 114*a* and 115*a*, the connecting body 116, the stirring plate 117 and the attachment tool 117*a* in the first rotating blade 110.

In this case, the arm tubes 134 and 135 are formed to have the same length as the arm tubes 114 and 115 and to have a smaller diameter than the arm tubes 114 and 115. Further, unlike the branch tube 112*b*, the branch tube 132*b* branches the liquid WK introduced from the second base tube 131 in two directions. Therefore, the branch tube 132*b* is formed in a T-shape by forming one flow path extending linearly in a direction perpendicular to an axial direction of the second base tube 131. The discharge tubes 134*a* and 135*a* are opened in an opposite direction to the discharge tubes 114*a* and 115*a* so that the arm tubes 134 and 135 rotate in an opposite direction to the arm tubes 114 and 115. Since a structure of the second rotating blade 130 other than the arm tubes 134 and 135, the branch tube 132*b*, and the discharge tubes 134*a* and 135*a* is the same as that of the first rotating blade 110, description thereof will be omitted.

(Operation of Liquid Stirring Apparatus 100)

Next, an operation of the liquid stirring apparatus 100 configured as described above will be described. First, the operator prepares the liquid stirring apparatus 100. Next, the operator sinks the liquid stirring apparatus 100 into the water tank TK in which the liquid WK is stored. In this case, it is preferred that the liquid stirring apparatus 100 is disposed to be immersed in the liquid WK up to the second rotating blade 130. However, even when the second rotating blade 130 is not immersed in the liquid WK, the liquid stirring apparatus 100 can stir the liquid WK as long as the first rotating blade 110 is immersed in the liquid WK.

Figure 5:
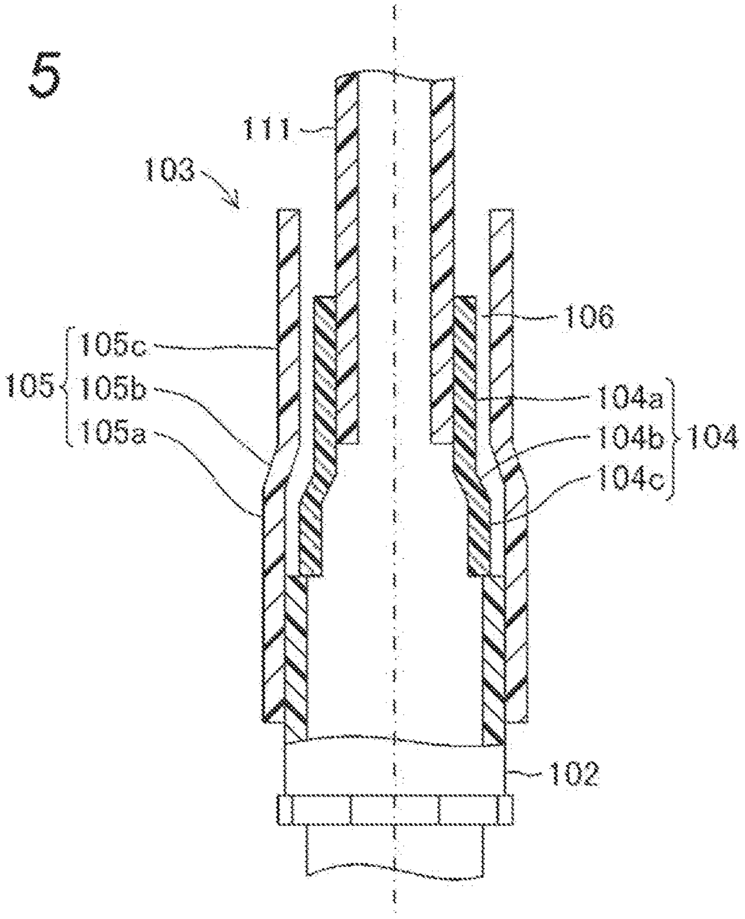
FIG. 5 is a cross-sectional view schematically showing a state where no liquid is supplied into the first rotating joint shown in FIG. 3.

In this case, as shown in FIG. 5, the first rotating joint 103 and the second rotating joint 120 in the liquid stirring apparatus 100 are respectively placed so that the tubular enlarged diameter portions 104 and 121 are placed on upper ends of the first main conduit 102 and the second main conduit 118 respectively by weights of the first rotating blade 110 and the second rotating blade 130. That is, the tubular flow paths 106 and 123 are in a state where the flow paths inside the first main conduit 102 and the second main conduit 118 are blocked.

Next, the operator connects the liquid discharge device 101 of the liquid stirring apparatus 100 to an external power supply (for example, a 100 V outlet) and starts operation of the liquid discharge device 101. Thus, the liquid discharge device 101 sucks the liquid WK from a bottom in the water tank TK and discharges the liquid WK to the first main conduit 102. A part of the liquid WK supplied into the first main conduit 102 hits the inclined surface 104*b* of the tubular enlarged diameter portion 104 in the first rotating joint 103, and pushes up an entire tubular enlarged diameter portion 104 upward.

Thus, the tubular enlarged diameter portion 104 is separated from the tip portion (upper end in the drawing) of the first main conduit 102 to be in a floating state. Therefore, the flow path inside the first main conduit 102 and the tubular flow path 106 are in communication with each other. Therefore, a part of the liquid WK flowing in the first main conduit 102 is introduced to the tubular flow path 106. It should be noted that floating of the tubular enlarged diameter portion 104 means that the first rotating blade 110, the second rotating joint 120, and the second rotating blade 130 are also displaced upward, because the tubular enlarged diameter portion 104 supports the first rotating blade 110, the second rotating joint 120, and the second rotating blade 130.

The liquid WK introduced into the tubular flow path 106 flows upward in the drawing in the tubular flow path 106, and then flows out of the outflow portion 105*c* to the outside. This prevents the tubular enlarged diameter portion 104 from directly contacting the tubular reduced diameter portion 105. Therefore, the tubular enlarged diameter portion 104 is rotatable with respect to the tubular reduced diameter portion 105. The liquid WK that has pushed up the tubular enlarged diameter portion 104 flows to the branch tube 112*a* through the first base tube 111. Thereafter, a part of the liquid WK flows to the two arm tubes 114 and another part of the liquid WK flows to the intermediate tube 113, by the branch tube 112*a*. Further, a part of the liquid WK that has flowed to the intermediate tube 113 flows to the two arm tubes 115 and another part of the liquid WK flows to the second main conduit 118, by the branch tube 112*b*.

The liquid WK flowing into the arm tubes 114 and 115 is discharged from the discharge tubes 114*a* and 115*a* in a concentric circumferential direction of the first base tube 111. Thus, the first rotating blade 110 rotates around the first base tube 111 while discharging the liquid WK (see a dashed arrow in FIG. 1). In this case, in the first rotating joint 103, since the discharge ports of the discharge tubes 114*a* and 115*a* face obliquely downward, the tubular enlarged diameter portion 104 is encouraged to float upward. Therefore, supply of the liquid WK to the tubular flow path 106 is ensured. Further, since the tubular enlarged diameter portion 104 is pressed against the liquid WK flowing through the tubular flow path 106, rotation of the first rotating blade 110 can be stabilized.

The arm tubes 114 and 115 are configured so that the liquid WK can flow through each other by the connecting body 116. Therefore, a discharge amount of the liquid WK discharged from the discharge tubes 114*a* and 115*a* is equalized. Further, a total of four stirring plates 117 attached to the arm tubes 114 and 115 are rotationally displaced together with rotational displacement of the arm tubes 114 and 115, and push the liquid WK away. As a result, the first rotating blade 110 can stir the liquid WK in the water tank TK by a rotation operation of the arm tubes 114 and 115 and the liquid WK discharged from the discharge tubes 114*a* and 115*a*.

On the other hand, the liquid WK introduced to the second main conduit 118 rotates the second rotating blade 130 in the same manner as the liquid WK introduced to the first main conduit 102. Specifically, a part of the liquid WK introduced to the second main conduit 118 hits the inclined surface 121*b* of the tubular enlarged diameter portion 121 in the second rotating joint 120, and pushes up an entire tubular enlarged diameter portion 121 upward.

Thus, the tubular enlarged diameter portion 121 is separated from an upper end of the second main conduit 118 to be in a floating state. Therefore, the flow path inside the second main conduit 118 and the tubular flow path 123 are in communication with each other. Therefore, a part of the liquid WK flowing in the second main conduit 118 is introduced to the tubular flow path 123. It should be noted that floating of the tubular enlarged diameter portion 121 means that the second rotating blade 130 is also displaced upward, because the tubular enlarged diameter portion 121 supports the second rotating blade 130.

The liquid WK introduced into the tubular flow path 123 flows upward in the drawing in the tubular flow path 123, and then flows out of the outflow portion 122*c* to the outside. This prevents the tubular enlarged diameter portion 121 from directly contacting the tubular reduced diameter portion 122. Therefore, the tubular enlarged diameter portion 121 is rotatable with respect to the tubular reduced diameter portion 122. The liquid WK that has pushed up the tubular enlarged diameter portion 121 flows to the branch tube 132*a* through the second base tube 131. Thereafter, a part of the liquid WK flows to the two arm tubes 134 and another part of the liquid WK flows to the intermediate tube 133, by the branch tube 132*a*. The liquid WK that has flowed through the intermediate tube 133 flows into the two arm tubes 135 by the branch tube 132*b*.

The liquid WK flowing into the arm tubes 134 and 135 is discharged from the discharge tubes 134*a* and 135*a* in a concentric circumferential direction of the second base tube 131. Thus, the second first rotating blade 130 rotates around the second base tube 131 while discharging the liquid WK (see a dashed arrow in FIG. 1). In this case, since the discharge tubes 134*a* and 135*a* are opened in the opposite direction to the discharge tubes 114*a* and 115*a* of the first rotating blade 110, the second rotating blade 130 rotates in an opposite direction to the first rotating blade 110. Further, since the second rotating blade 130 is formed to have a smaller inner diameter than the first rotating blade 110, a discharge force of the liquid WK from the discharge tubes 134*a* and 135*a* is increased, and the second rotating blade 130 rotates at a higher circumferential velocity than the first rotating blade 110.

In the second rotating joint 120, similarly to the first rotating joint 103, since the discharge ports of the discharge tubes 134*a* and 135*a* face obliquely downward, the tubular enlarged diameter portion 121 is encouraged to float upward. Therefore, supply of the liquid WK to the tubular flow path 123 is ensured, and the tubular enlarged diameter portion 121 is pressed against the liquid WK flowing through the tubular flow path 123, so that rotation of the second rotating blade 130 can be stabilized.

The arm tubes 134 and 135 are configured so that the liquid WK can flow through each other by the connecting body 136. Therefore, the discharge amount of the liquid WK discharged from the discharge tubes 134*a* and 135*a* is equalized. Further, a total of four stirring plates 137 attached to the arm tubes 134 and 135 are rotationally displaced together with rotational displacement of the arm tubes 134 and 135, and push the liquid WK away. As a result, the second rotating blade 130 can stir the liquid WK above the first rotating blade 110 in the water tank TK by a rotation operation of the arm tubes 134 and 135 and the liquid WK discharged from the discharge tubes 134*a* and 135*a*.

Thus, the liquid stirring apparatus 100 can rapidly stir the liquid WK in a wide range in the water tank TK. In this case, when the operator puts a medicine such as a neutralizing agent into the water tank TK, the put medicine can be rapidly stirred to perform a quick and uniform neutralization reaction. In addition, the liquid stirring apparatus 100 can also stir the liquid WK around the first rotating joint 103 and the second rotating joint 120 by outflow of the liquid WK from the outflow portions 105*c* and 122*c*.

When the operator inserts a hand or a rod into the water tank TK during stirring operation of the liquid WK in the water tank TK, the hand or the rod may be located in a rotation plane of the first rotating blade 110 and/or the second rotating blade 130 and may contact the first rotating blade 110 and/or the second rotating blade 130. In this case, since the first rotating blade 110 and/or the second rotating blade 130 are rotated by the discharge force of the liquid WK from the discharge tubes 114*a* and 134*a*, their rotation is easily stopped, and thus an operation by the hand or the rod is not disturbed.

Next, when the operator interrupts the stirring operation of the liquid WK in the water tank TK, the operator disconnects an electrical connection between the liquid discharge device 101 and the external power supply, to stop suction and discharge of the liquid WK by the liquid discharge device 101. Thus, in the liquid stirring apparatus 100, the rotation of the first rotating blade 110 and the second rotating blade 130 is stopped. Further, the tubular enlarged diameter portions 104 and 121 descend and respectively abut the first main conduit 102 and the second main conduit 118, and communication between them and the tubular flow paths 106 and 123 are blocked. Then, the operator can finish the operation by taking out the liquid stirring apparatus 100 from the liquid WK in the water tank TK.

As can be understood from the above description of the operation, according to the embodiment, the liquid stirring apparatus 100 includes the first rotating blade 110 and the second rotating blade 130 at mutually different positions in the axial direction of the first base tube 111 and the second base tube 131 which introduce the liquid WK. Further, the first rotating blade 110 and the second rotating blade 130 are respectively provided with the plate-shaped stirring plates 117 and 137 extending in a direction intersecting the direction in which they rotate. Therefore, the liquid stirring apparatus 100 can strongly stir the liquid WK in a wide range.

Further, implementation of the present invention is not limited to the above embodiment, and various modifications can be made without departing from the object of the present invention. In the following modifications, the same components as those in the above embodiment are denoted by the same reference numerals, and description thereof will be omitted.

Figure 6:
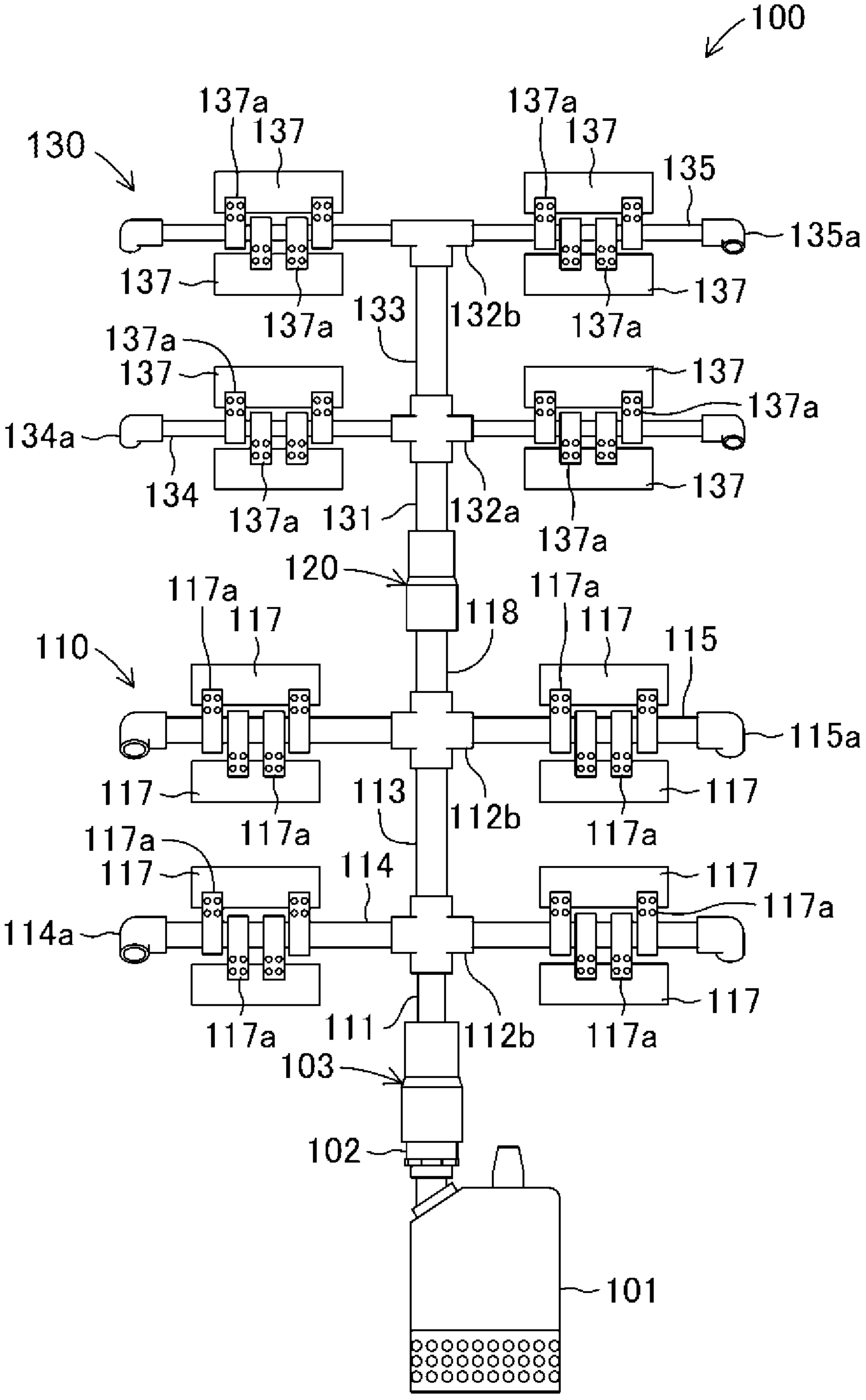
FIG. 6 is a front view schematically showing the liquid stirring apparatus according to a modification of the present invention.

For example, in the above embodiment, the stirring plates 117 and 137 are respectively attached to the connecting bodies 116 and 136. However, the stirring plates 117 and 137 can also be attached to the arm tubes 114, 115, 134 and 135 as shown in FIG. 6. In this case, the stirring plates 117 and

Figure 7:
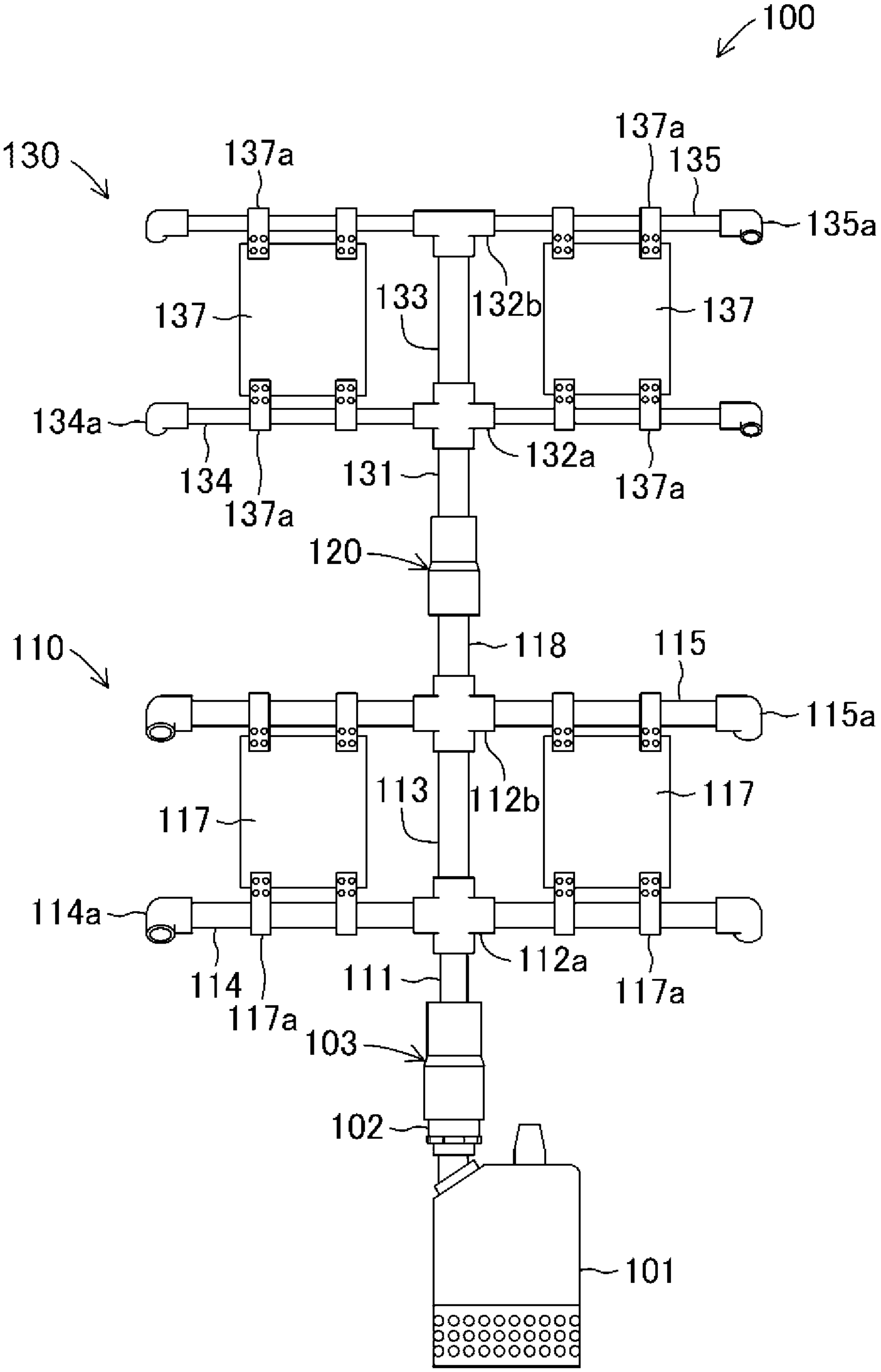
FIG. 7 is a front view schematically showing the liquid stirring apparatus according to another modification of the present invention.

137 can be attached bridged between the arm tubes 114 and 115 and/or between the arm tubes 134 and 135 as shown in FIG. 7.

Figure 8:
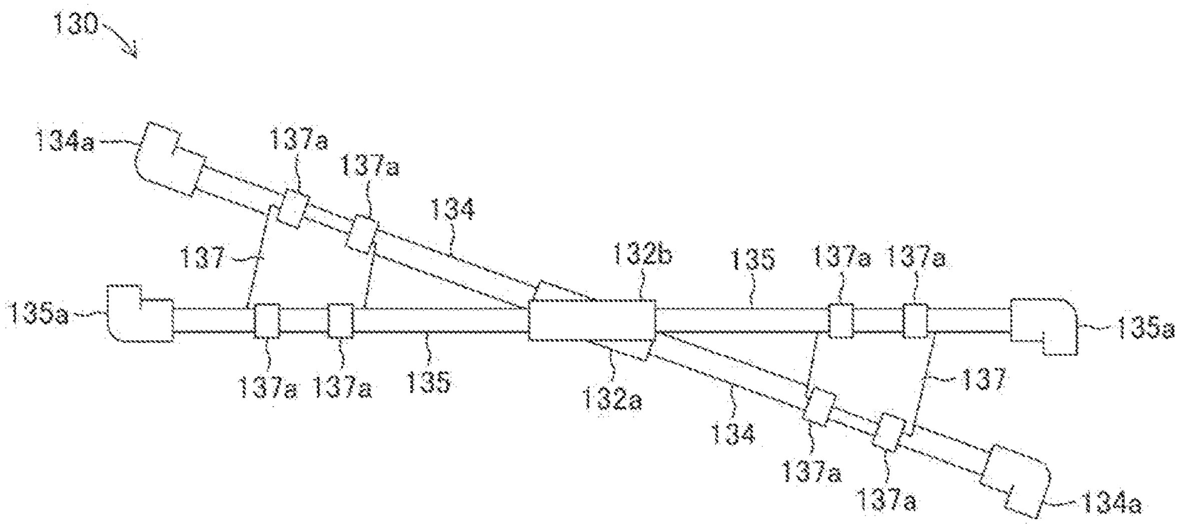
FIG. 8 is a plan view schematically showing only a second rotating blade in the liquid stirring apparatus according to another modification of the present invention.
Figure 9:
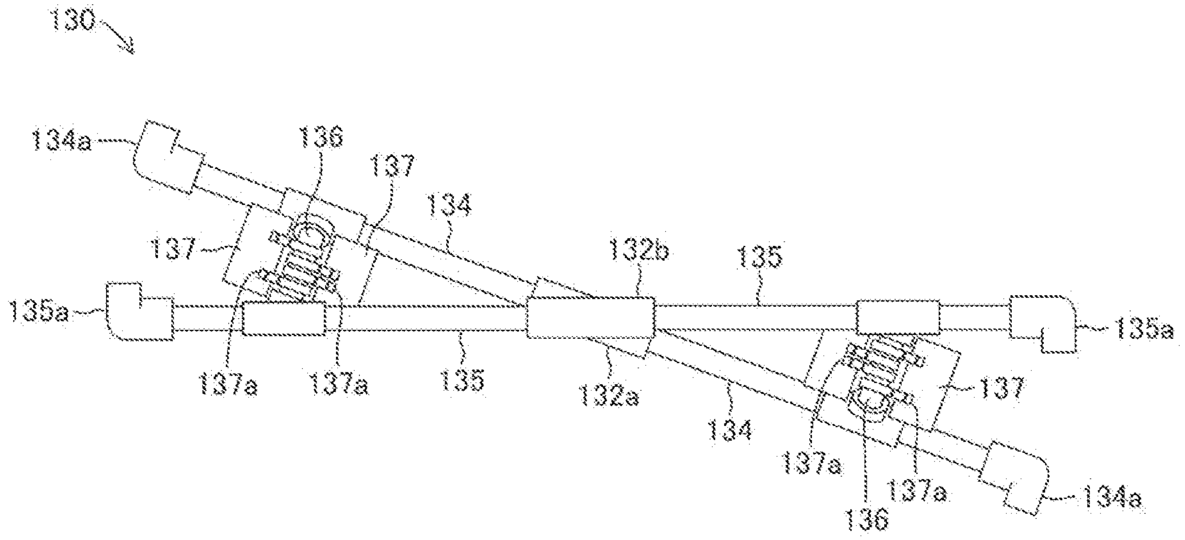
FIG. 9 is a plan view schematically showing only the second rotating blade in the liquid stirring apparatus according to another modification of the present invention.

In this case, the arm tube 114 and the arm tube 115 and/or the arm tube 134 and the arm tube 135 are, as respectively shown in FIGS. 8 and 9, arranged at positions shifted in the circumferential direction of the first base tube 111 and/or the second base tube 131, so that the stirring plates 117 and 137 can be provided not perpendicular to but inclined to a rotation direction of the first rotating blade 110 and/or the second rotating blade 130. That is, the stirring plates 117 and 137 can be attached inclined to a water surface or a water bottom of the liquid WK. Thus, the liquid stirring apparatus 100 can perform effective stirring in the depth direction of the liquid WK while suppressing stirring resistance of the liquid WK.

Here, in an example shown in FIG. 8, the arm tube 134 and the arm tube 135 are arranged at positions shifted in the circumferential direction of the second base tube 131. Further, the stirring plate 137 is directly attached to the arm tube 134 and the arm tube 135 in a direction inclined to the water bottom. Here, in the example shown in FIG. 9, the arm tube 134 and the arm tube 135 are arranged at positions shifted in the circumferential direction of the second base tube 131. Further, the stirring plate 137 is attached to the connecting body 136 bridged between the arm tube 134 and the arm tube 135 in the direction inclined to the water bottom. Note that, even when the stirring plates 117 and 137 are attached to the arm tubes 114, 115, 134 and 135 and/or when they are attached to the connecting bodies 116 and 136, they can be naturally attached inclined to the water surface of the liquid WK.

In the above embodiment, the stirring plates 117 and 137 are respectively attached to the connecting bodies 116 and 136 in any direction and detachably via the attachment tools 117*a* and 137*a*. However, the stirring plates 117 and 137 may be irremovably provided changeable to any direction with respect to the connecting bodies 116 and 136, or can also be irremovably provided in only one specific direction. Further, the stirring plates 117 and 137 can also be attached to the connecting bodies 116 and 136 by a structure different from the attachment tools 117*a* and 137*a*. For example, the stirring plates 117 and 137 can be attached to a part of the connecting bodies 116 and 136 so as to protrude from an outer circumferential surface of a cylindrical body rotatably connected in the circumferential direction. Further, the stirring plates 117 and 137 can also be fixedly attached to outer circumferential surfaces of the connecting bodies 116 and 136 with the adhesive or by welding.

In the above embodiment, the first rotating blade 110 and the second rotating blade 130 are configured to respectively include the arm tubes 114 and 115 and the arm tubes 134 and 135 at two different positions in the axial direction of the first base tube 111 and the second base tube 131. However, the first rotating blade 110 and the second rotating blade 130 only need to be configured to include at least one arm tube in the axial direction of the first base tube 111 and the second base tube 131.

Figure 10:
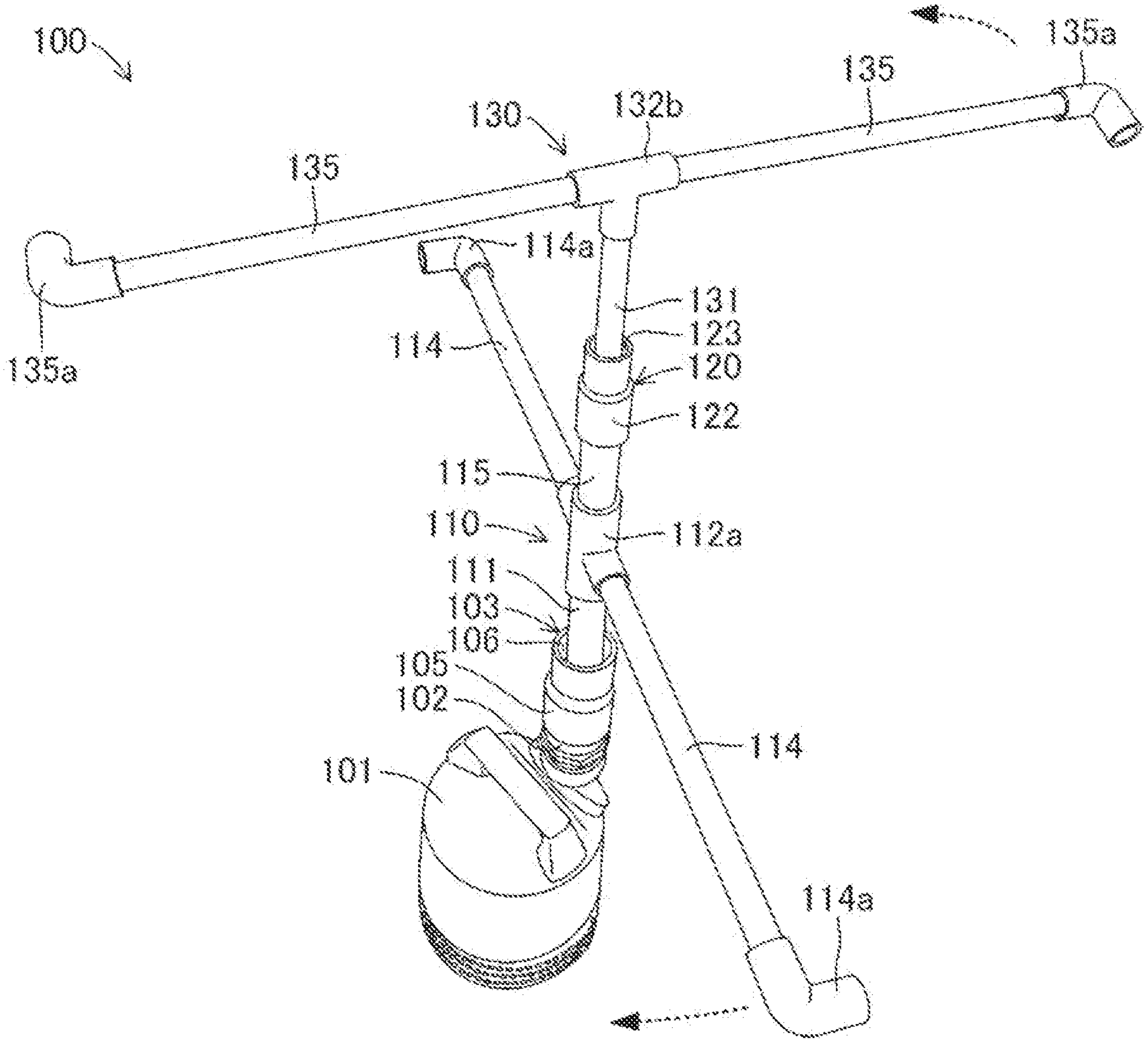
FIG. 10 is a perspective view schematically showing the external structure of the liquid stirring apparatus according to another modification of the present invention.

That is, as shown in FIG. 10, the liquid stirring apparatus 100 can be configured such that the first rotating blade 110 and the second rotating blade 130 include only the arm tube 114 or the arm tube 115 and/or only the arm tube 134 or the arm tube 135. Here, in the example shown in FIG. 10, the first rotating blade 110 and the second rotating blade 130 respectively include only the arm tube 114 and the arm tube 135. In this case, in the liquid stirring apparatus 100, the branch tubes 112*b* and 132*a*, the intermediate tubes 113 and 133, and the connecting bodies 116 and 136 are not necessary. The stirring plates 117 and 137 may be provided or may be omitted.

In these cases, the arm tube 114 or the arm tube 115 and/or the arm tube 134 or the arm tube 135 may be formed of two tube bodies coaxially in a radial direction of the first base tube 111 and the second base tube 131 (see FIG. 10), and may be formed of one tube body. Further, the first rotating blade 110 and the second rotating blade 130 can also be configured to include three or more arm tubes at mutually different positions in the axial direction of the first base tube 111 and the second base tube 131. In FIG. 10, the rotation directions of the first rotating blade 110 and the second rotating blade 130 are indicated by dashed arrows.

In the above embodiment, the first rotating blade 110 and the second rotating blade 130 are configured to respectively include the connecting bodies 116 and 136. However, as shown in FIG. 7, the first rotating blade 110 and/or the second rotating blade 130 may also be configured such that the connecting body 116 and/or the connecting body 136 are omitted.

In the above embodiment, the liquid discharge device 101 is constituted by the submersible pump of a size that can be carried by a person. However, the liquid discharge device 101 only needs to be constituted by a liquid discharge device that sucks the liquid from the water tank TK or a water tank other than the water tank TK and discharges the liquid WK into the water tank TK. Therefore, the liquid discharge device can be constituted by, for example, a pipe communicating with an inside of the water tank TK, a pump connected to the pipe, and a pipe communicating the pump with the inside of the water tank TK. Note that since the liquid stirring apparatus 100 only needs to be configured such that the liquid WK is supplied to the first main conduit 102, the liquid discharge device 101 is not necessarily required. That is, the liquid stirring apparatus 100 can be configured such that the water tank TK is directly connected to the first main conduit 102 and the liquid WK is supplied thereto.

In the above embodiment, the connecting bodies 116 and 136 are formed so that the liquid WK can flow between the arm tubes 114 and 115 and between the arm tubes 134 and 135. However, connecting bodies 116 and 136 can also be formed so that the liquid WK cannot flow between the arm tubes 114 and 115 and between the arm tubes 134 and 135. That is, the connecting bodies 116 and 136 can also be formed of solid rods. Also in this case, the connecting bodies 116 and 136 can increase rigidity of the arm tubes by integrally connecting the arm tube 114 and the arm tube 115 and/or the arm tube 134 and the arm tube 135.

In the above embodiment, the second rotating blade 130 is configured to rotate in a direction opposite to the first rotating blade 110 at a higher speed than the first rotating blade 110. However, the second rotating blade 130 may be rotated in the same direction with the first rotating blade 110, or may be configured to rotate at the same or a lower speed as the first rotating blade 110.

In the above embodiment, a tubular body constituting the second rotating blade 130 is formed to have an inner diameter smaller than that of the tubular body constituting the first rotating blade 110. However, the tubular body constituting the second rotating blade 130 may be formed to have the same or larger inner diameter as the tubular body constituting the first rotating blade 110. Further, by forming the arm tubes 134 and 135 constituting the second rotating blade 130 so as to have a shorter length than the arm tubes

114 and 115 constituting the first rotating blade 110, an installation state of the liquid stirring apparatus 100 can be stabilized.

In the above embodiment, the discharge tubes 114*a* and 134*a* are formed to open obliquely downward with respect to the rotation planes of the first rotating blade 110 and the second rotating blade 130. However, the discharge tubes 114*a* and 134*a* only need to be formed oriented such that the first rotating blade 110 and the second rotating blade 130 can be rotated in the circumferential direction of the first base tube 111 and the second base tube 131. Therefore, the discharge tubes 114*a* and 134*a* can also be formed to open parallel or obliquely upward with respect to the rotation surfaces of the first rotating blade 110 and the second rotating blade 130.

In the above embodiment, the liquid stirring apparatus 100 is disposed at a bottom of the water tank TK, and the first base tube 111 and the second base tube 131 are installed to extend in the depth direction of the water tank TK. However, the liquid stirring apparatus 100 is disposed at the bottom of the water tank TK, and the first main conduit 102 and/or the second main conduit 118 may be configured and installed to be bent so that the first base tube 111 and the second base tube 131 extend in a direction perpendicular to the depth direction of the water tank TK. The liquid stirring apparatus 100 itself can also be installed in a direction extending in the direction perpendicular to the depth direction of the water tank TK (that is, sideways).

In the above embodiment, the liquid stirring apparatus 100 is configured to include two rotating blades of the first rotating blade 110 and the second rotating blade 130. However, the liquid stirring apparatus 100 can also be configured to include not only the first rotating blade 110 and the second rotating blade 130 but three or more rotating blades.

In the above embodiment, the liquid stirring apparatus 100 is configured to include the first rotating joint 103 and the second rotating joint 120 in order to rotatably support the first rotating blade 110 and the second rotating blade 130 with respect to the first main conduit 102 and the second main conduit 118. However, the liquid stirring apparatus 100 only needs to rotatably support the first rotating blade 110 and the second rotating blade 130 with respect to the first main conduit 102 and the second main conduit 118. Therefore, the liquid stirring apparatus 100 can be configured to rotatably support the first rotating blade 110 and the second rotating blade 130 with respect to the first main conduit 102 and the second main conduit 118 via bearings. That is, the liquid stirring apparatus 100 can be configured such that the first rotating joint 103 and the second rotating joint 120 are omitted.

Note that the first rotating joint 103 and the second rotating joint 120 are structures for rotatably supporting the first rotating blade 110 and the second rotating blade 130 with respect to the first main conduit 102 and the second main conduit 118. Therefore, the liquid stirring apparatus 100 can be configured to include only one of the first rotating joint 103 and the second rotating joint 120. That is, the liquid stirring apparatus 100 can be configured to include the liquid discharge device 101, the first main conduit 102, the first rotating joint 103 and the first rotating blade 110. In this case, an opening of a connection portion of the second main conduit 118 in the branch tube 112*a* is preferably closed.

In the above embodiment, the tubular enlarged diameter portions 104 and 121 and the tubular reduced diameter portions 105 and 122 in the first rotating joint 103 and the second rotating joint 120 are configured to respectively include the inclined surfaces 104*b*, 121*b*, 105*b*, and 122*b*. However, the tubular enlarged diameter portions 104 and 121 and the tubular reduced diameter portions 105 and 122 can also be configured such that a step-shaped portion is formed to have an inner diameter and an outer diameter changing stepwise between the fitting portions 104*a*, 121*a* and the facing portions 104*c*, 121*c*, and between the fitting portions 105*a*, 122*a* and the outflow portions 105*c*, 122*c*, and the inclined surfaces 104*b*, 121*b*, 105*b*, and 122*b* are omitted.

Figure 11:
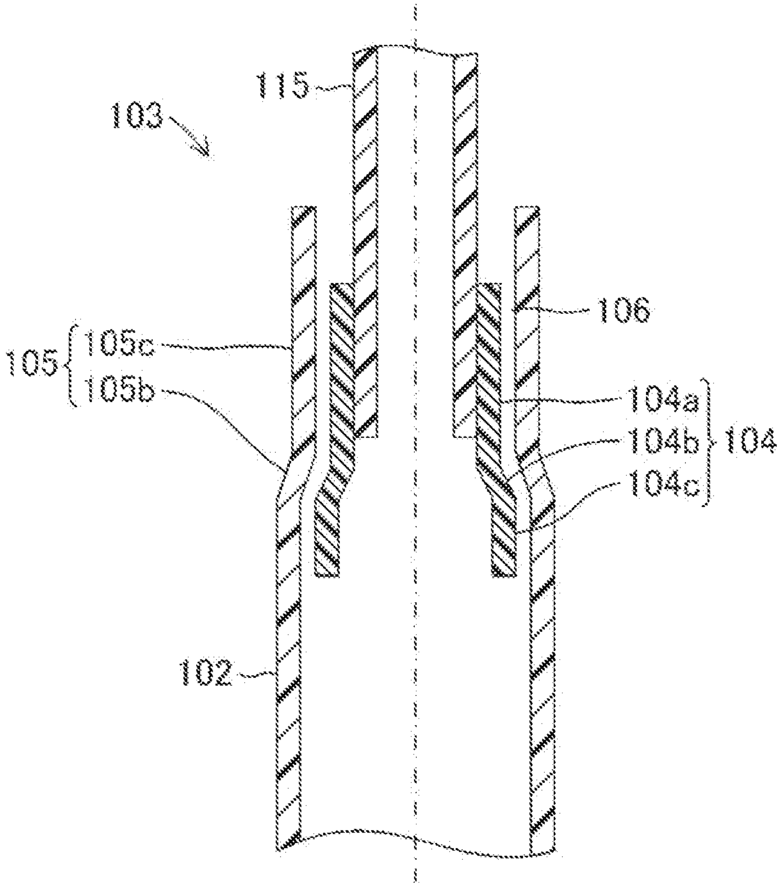
FIG. 11 is a cross-sectional view schematically showing the internal structure of the first rotating joint according to another modification of the present invention.

In the above embodiment, the first rotating joint 103 and the second rotating joint 120 are configured such that the tubular enlarged diameter portions 104 and 121 respectively abut the tip portions of the first main conduit 102 and the second main conduit 118. However, the first rotating joint 103 and the second rotating joint 120 can also be configured such that the tubular enlarged diameter portions 104 and 121 respectively do not abut the tip portions of the first main conduit 102 and the second main conduit 118. For example, as shown in FIG. 11, the first rotating joint 103 can be configured such that the first main conduit 102 integrally extends from a lower end portion of the inclined surface 105*b* of the tubular reduced diameter portion 105 in the drawing. In this case, when the liquid discharge device 101 is in a stopped state of not sucking the liquid WK, the first rotating blade 110 descends to be in contact with and placed on the tubular reduced diameter portion 105.

Figure 12:
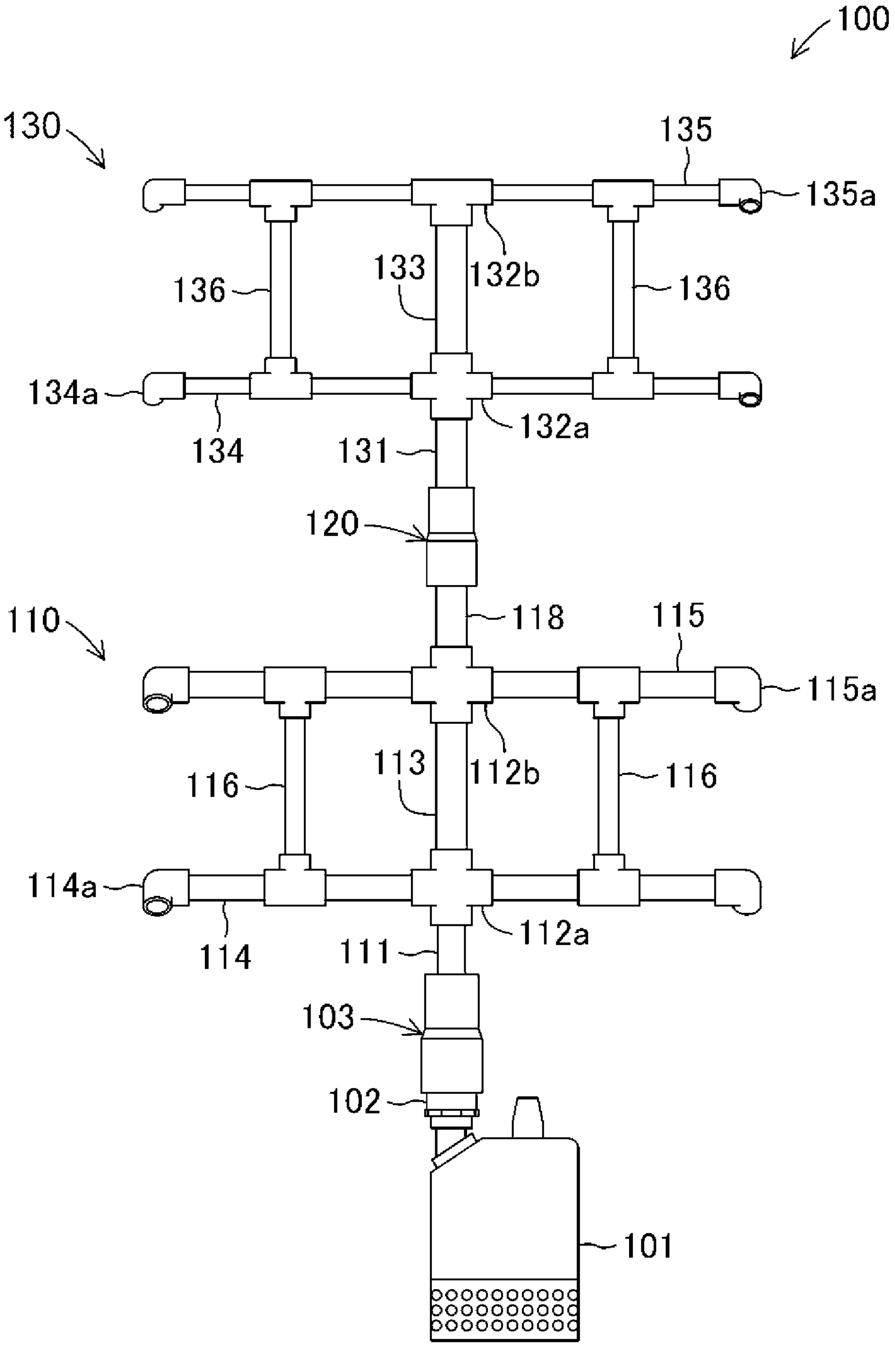
FIG. 12 is a front view schematically showing the liquid stirring apparatus according to another embodiment of the present invention.

In the above embodiment, the liquid stirring apparatus 100 is configured to include the stirring plates 117 and 137. However, the liquid stirring apparatus 100 can be configured such that the stirring plates 117 and 137 are omitted as shown in FIG. 10. Further, as shown in FIG. 12, the liquid stirring apparatus 100 is configured to include at least two or more of the arm tubes 114, 115, 134 and 135 at mutually different positions in the axial direction of the first base tube 111 and the second base tube 131 instead of the stirring plates 117 and 137 instead of the stirring plates 117 and 137, so that an ability to stir the liquid WK can be ensured. In this case, the liquid stirring apparatus 100 can be configured such that the connecting bodies 116 and 136, and the first rotating joint 103 and the second rotating joint 120 are employed or not employed as in the above embodiment and modifications. Here, the liquid stirring apparatus 100 shown in FIG. 12 is configured such that the first rotating blade 110 includes two arm tubes 114 and 115 and the connecting body 116, and the second rotating blade 130 includes two arm tubes 134 and 135 and the connecting body 136.

In the above embodiment, the liquid stirring apparatus 100 is configured such that the first main conduit 102 and the second main conduit 118 extend in the depth direction of the water tank TK. However, the liquid stirring apparatus 100 may be configured such that at least one of the first main conduit 102 and the second main conduit 118 extends in the horizontal or oblique direction of the water tank TK.

In the above embodiment, the liquid stirring apparatus 100 is installed in the water tank TK. However, the liquid stirring apparatus 100 can be widely used in a place where the liquid WK to be stirred is stored. Therefore, the liquid stirring apparatus 100 can also be used, for example, in a pool, a tank, a pond, a lake, a river or sea. Further, it is natural that the liquid WK may be various liquids other than the alkaline drainage which has been used for concrete chipping work.

LIST OF REFERENCE NUMERALS

TK: water tank, WK: liquid, 100: liquid stirring apparatus, 101: liquid discharge device, 102: first main conduit, 103:

first rotating joint, 104: tubular enlarged diameter portion, 104*a*: fitting portion, 104*b*: inclined surface, 104*c*: facing portion, 105: tubular reduced diameter portion, 105*a*: fitting portion, 105*b*: inclined surface, 105*c*: outflow portion, 106: tubular flow path, 110: first rotating blade, 111: first base tube, 112*a*, 112*b*: branch tube, 113: intermediate tube, 114, 115: arm tube, 114*a*, 115*a*: discharge tube, 116: connecting body, 117: stirring plate, 117*a*: attachment tool, 118: second main conduit, 120: second rotating joint, 121: tubular enlarged diameter portion, 121*a*: fitting portion, 121*b*: inclined surface, 121*c*: facing portion, 122: tubular reduced diameter portion, 122*a*: fitting portion, 122*b*: inclined surface, 122*c*: outflow portion, 123: tubular flow path, 130: second rotating blade, 131: second base tube, 132*a*, 132*b*: branch tube, 133: intermediate tube, 134, 135: arm tube, 134*a*, 135*a*: discharge tube, 136: connecting body, 137: stirring plate, 137*a*: attachment tool.

The invention claimed is:

1. A liquid stirring apparatus for stirring liquid, comprising:

a first main conduit that receives the liquid and allows the liquid to flow therethrough;

a first rotating blade having a first base tube made of a tubular body communicating with the first main conduit, and discharging the liquid in a circumferential direction of the first base tube to rotate in the circumferential direction;

a second main conduit that is formed to extend in a tubular shape from the first rotating blade in a depth direction of the liquid, and allows the liquid to flow therethrough; and a second rotating blade having a second base tube made of a tubular body communicating with the second main conduit, and discharging the liquid in a circumferential direction of the second base tube to rotate in the circumferential direction, wherein at least one of the first rotating blade and the second rotating blade includes a stirring plate formed in a plate shape extending in a direction intersecting the direction of rotation.

2. The liquid stirring apparatus according to claim 1, wherein the second rotating blade rotates in a direction opposite to the first rotating blade by discharging the liquid introduced from the second main conduit in a direction opposite to a discharge direction of the first rotating blade.

3. The liquid stirring apparatus according to claim 1, wherein the second rotating blade rotates at a higher speed than the first rotating blade.

4. The liquid stirring apparatus according to claim 1, wherein the second rotating blade is formed of a tube smaller than the first rotating blade.

5. The liquid stirring apparatus according to claim 1, wherein the stirring plate is provided not perpendicular to but inclined to the direction of rotation.

6. The liquid stirring apparatus according to claim 1, wherein the stirring plate is detachably provided in the first rotating blade and/or the second rotating blade.

7. The liquid stirring apparatus according to claim 1, wherein the stirring plate is provided changeable in direction with respect to the first rotating blade and/or the second rotating blade.

8. The liquid stirring apparatus according to claim 1, wherein at least one of the first rotating blade and the second rotating blade includes at least two arm tubes made of at least two tubular bodies, the tubular bodies extend radially at mutually different positions in an axial direction of a corresponding one of the first base tube and the second base tube, and the arm tubes rotate in the circumferential direction by discharging the liquid in the circumferential direction of the base tubes.

9. The liquid stirring apparatus according to claim 8, further comprising a connecting body for connecting the at least two arm tubes to each other.

10. The liquid stirring apparatus according to claim 9, wherein the connecting body is formed in a tubular shape to allow the liquid to flow between the arm tubes connected to each other.

11. The liquid stirring apparatus according to claim 9, wherein the stirring plate is provided on the connecting body.

12. A liquid stirring apparatus for stirring liquid, comprising:

a first main conduit that receives the liquid and allows the liquid to flow therethrough;

a first rotating blade having a first base tube made of a tubular body communicating with the first main conduit, and discharging the liquid in a circumferential direction of the first base tube to rotate in the circumferential direction;

a second main conduit that is formed to extend in a tubular shape from the first rotating blade in a depth direction of the liquid, and allows the liquid to flow therethrough; and a second rotating blade having a second base tube made of a tubular body communicating with the second main conduit, and discharging the liquid in a circumferential direction of the second base tube to rotate in the circumferential direction, wherein at least one of the first rotating blade and the second rotating blade includes at least two arm tubes made of at least two tubular bodies, the tubular bodies of the first rotating blade extending radially at mutually different positions in an axial direction of the first base tube, the tubular bodies of the second rotating blade extending radially at mutually different positions in an axial direction of the second base tube, and the arm tubes rotate in the circumferential direction by discharging the liquid in the circumferential direction of the base tubes.

13. The liquid stirring apparatus according to claim 12, further comprising a connecting body for connecting the at least two arm tubes to each other.

14. The liquid stirring apparatus according to claim 13, wherein the connecting body is formed in a tubular shape to allow the liquid to flow between the arm tubes connected to each other.

15. A liquid stirring apparatus for stirring liquid, comprising:

a first main conduit that receives the liquid and allows the liquid to flow therethrough;

a first rotating blade having a first base tube made of a tubular body communicating with the first main conduit, and discharging the liquid in a circumferential direction of the first base tube to rotate in the circumferential direction;

a second main conduit that is formed to extend in a tubular shape from the first rotating blade in a depth direction of the liquid, and allows the liquid to flow therethrough;

a second rotating blade having a second base tube made of a tubular body communicating with the second main conduit, and discharging the liquid in a circumferential direction of the second base tube to rotate in the circumferential direction; and a rotating joint for rotatably connecting at least one of the first rotating blade and the second rotating blade to a corresponding one of the first main conduit and the second main conduit, wherein the rotating joint includes:

a tubular enlarged diameter portion formed in a tubular shape having an outer diameter that increases from a portion where the base tube is connected in the rotating blade to a portion where the main conduit is connected;

a tubular reduced diameter portion formed in a tubular shape having an inner diameter that is reduced while covering an outer circumferential surface of the tubular enlarged diameter portion through a tubular gap from the portion where the main conduit is connected; and a tubular flow path that is formed by the tubular gap between the outer circumferential surface of the tubular enlarged diameter portion and an inner circumferential surface of the tubular reduced diameter portion, and communicates with an inside of the main conduit and an outside of the main conduit.

16. The liquid stirring apparatus according to claim 15, wherein the tubular enlarged diameter portion is configured to have an inclined surface having gradually increasing outer diameter and inner diameter, and the tubular enlarged diameter portion and the main conduit are formed so that their tip portions can face each other and abut each other.

17. The liquid stirring apparatus according to claim 16, wherein in the rotating blade, a discharge port for discharging the liquid is inclined toward the rotating joint side with respect to a rotation plane of the rotating blade.

* * * * *